United States Patent
Agnew

(10) Patent No.: US 9,573,452 B2
(45) Date of Patent: Feb. 21, 2017

(54) REAR CARRIAGE STRUCTURE FOR AN ELECTRIC VEHICLE

(71) Applicant: Squaw-Fleet, LLC, Salt Lake City, UT (US)

(72) Inventor: Brooks Alexander Agnew, Concord, NC (US)

(73) Assignee: Squaw-Fleet, LLC, Salt Lake City, UT (US)

( * ) Notice: Subject to any disclaimer, the term of this patent is extended or adjusted under 35 U.S.C. 154(b) by 0 days.

(21) Appl. No.: 14/679,881

(22) Filed: Apr. 6, 2015

(65) Prior Publication Data

US 2015/0283889 A1    Oct. 8, 2015

Related U.S. Application Data

(60) Provisional application No. 61/976,405, filed on Apr. 7, 2014.

(51) Int. Cl.
*B60K 1/00* (2006.01)
*B60K 1/04* (2006.01)

(52) U.S. Cl.
CPC . *B60K 1/00* (2013.01); *B60K 1/04* (2013.01); *B60K 2001/001* (2013.01); *B60K 2001/0416* (2013.01); *B60K 2001/0438* (2013.01); *B60Y 2304/076* (2013.01)

(58) Field of Classification Search
CPC .......... B60K 1/00; B60K 1/04; B60K 17/165; B60K 17/12; B60K 17/14; B60K 2001/0416; B60K 2001/001; B60K 2001/0438
See application file for complete search history.

(56) References Cited

U.S. PATENT DOCUMENTS

| | | | |
|---|---|---|---|
| 5,498,216 A | 3/1996 | Bitsche et al. | |
| 5,827,148 A | 10/1998 | Seto et al. | |
| 6,059,684 A * | 5/2000 | Sasaki | F16H 57/028 180/65.6 |
| 6,820,707 B1 * | 11/2004 | Cantemir | B60T 1/062 180/65.6 |
| 6,978,853 B2 | 12/2005 | Bennet | |
| 7,219,571 B2 * | 5/2007 | McCrary | F16H 61/32 74/335 |

(Continued)

FOREIGN PATENT DOCUMENTS

DE    102009015414    9/2010
DE    102012012327 A1 * 12/2012

(Continued)

OTHER PUBLICATIONS

Search Report and Written Opinion issued for International Patent Application No. PCT/US2015/024683 on Jul. 8, 2015.

*Primary Examiner* — Hau Phan
*Assistant Examiner* — Jacob Meyer
(74) *Attorney, Agent, or Firm* — Austin Rapp & Hardman

(57) ABSTRACT

An electric vehicle traction drive assembly includes a variable-speed electric motor for providing the torque. A multi-speed transaxle multiplies the torque of the electric motor through the vehicle operator's selection between more than one gear ratio. An adapter mechanically couples the motor and the transaxle to integrate the motor with the transaxle keeping an output shaft of the motor center-aligned with an input shaft of the transaxle.

13 Claims, 11 Drawing Sheets

(56) References Cited

U.S. PATENT DOCUMENTS

| | | | | |
|---|---|---|---|---|
| 7,383,748 | B2* | 6/2008 | Rankin | B60K 17/02 403/359.1 |
| 8,066,492 | B2* | 11/2011 | Rogner | F04C 15/008 417/17 |
| 8,464,611 | B1* | 6/2013 | Chandler | F16H 57/037 74/607 |
| 8,479,851 | B2 | 7/2013 | Mack et al. | |
| 8,479,858 | B2* | 7/2013 | Kodaira | B60K 1/04 180/68.5 |
| 8,479,868 | B2* | 7/2013 | Wakatsuki | B60K 1/00 180/291 |
| 8,517,140 | B2* | 8/2013 | West | B60G 3/20 180/360 |
| 8,517,882 | B2 | 8/2013 | Wenthen | |
| 8,556,760 | B2 | 10/2013 | Mack et al. | |
| 8,584,789 | B2* | 11/2013 | Dusi | B60K 5/1216 180/300 |
| 8,596,403 | B2* | 12/2013 | Cunningham | B60K 1/00 180/291 |
| 8,650,979 | B2 | 2/2014 | Ren et al. | |
| 8,651,216 | B2* | 2/2014 | Wakatsuki | B62D 21/11 180/291 |
| 8,657,365 | B2* | 2/2014 | Amano | B60K 1/00 296/187.11 |
| 8,720,636 | B2* | 5/2014 | Akoum | B60K 1/00 180/299 |
| 8,813,883 | B2* | 8/2014 | Fujiwara | B60K 6/46 180/312 |
| 8,862,296 | B2* | 10/2014 | Kurakawa | B60K 1/04 701/22 |
| 8,936,130 | B2* | 1/2015 | Hirashita | B60K 1/00 180/291 |
| 8,991,530 | B2* | 3/2015 | Langer | B60K 1/00 180/312 |
| 9,061,577 | B2* | 6/2015 | Choi | B60W 10/08 |
| 9,132,879 | B2* | 9/2015 | Yelvington | B62K 11/02 |
| 9,145,961 | B2* | 9/2015 | Suzuki | B60K 6/448 |
| 9,221,496 | B2* | 12/2015 | Barr | B62D 21/11 |
| 2005/0077137 | A1* | 4/2005 | Nozaki | B60K 17/02 192/38 |
| 2007/0158119 | A1 | 7/2007 | Pascoe | |
| 2008/0078603 | A1* | 4/2008 | Taji | B60K 1/00 180/312 |
| 2011/0132672 | A1* | 6/2011 | Niina | B60K 1/00 180/60 |
| 2012/0052995 | A1* | 3/2012 | Scarbo | B60K 7/0007 474/86 |
| 2012/0142474 | A1* | 6/2012 | Troennberg | B60K 1/00 475/149 |
| 2012/0142487 | A1* | 6/2012 | Winter | B60K 1/00 475/332 |
| 2012/0255804 | A1* | 10/2012 | Akoum | B60K 1/00 180/291 |
| 2013/0019707 | A1* | 1/2013 | Ebihara | B60K 7/0007 74/468 |
| 2013/0105241 | A1* | 5/2013 | Christian | B60K 17/12 180/337 |
| 2013/0139626 | A1* | 6/2013 | Agnew | B60L 11/00 74/325 |
| 2013/0168176 | A1 | 7/2013 | Takagi | |
| 2013/0192400 | A1* | 8/2013 | Dodo | B60K 1/00 74/421 A |
| 2013/0223972 | A1* | 8/2013 | Eng | B60P 3/079 414/812 |
| 2013/0240273 | A1* | 9/2013 | Langer | B60K 1/00 180/55 |
| 2014/0014422 | A1* | 1/2014 | Hirashita | B60K 1/00 180/65.6 |
| 2014/0051538 | A1* | 2/2014 | Wenthen | B60K 1/00 475/150 |
| 2014/0182954 | A1* | 7/2014 | Weber | B60K 17/16 180/65.7 |
| 2014/0191485 | A1* | 7/2014 | Yelvington | B62K 11/02 280/124.11 |
| 2014/0262588 | A1* | 9/2014 | Bruns | B60K 1/00 180/291 |
| 2015/0119180 | A1* | 4/2015 | Valler | B60K 17/16 475/150 |
| 2015/0119181 | A1* | 4/2015 | Fox | B60K 1/00 475/150 |
| 2015/0122561 | A1* | 5/2015 | Kashiwai | B60K 1/00 180/65.6 |
| 2015/0375783 | A1* | 12/2015 | Yamamoto | B60K 1/00 180/253 |

FOREIGN PATENT DOCUMENTS

| | | |
|---|---|---|
| FR | 2957849 A1 * | 9/2011 |
| FR | 2975067 A1 * | 11/2012 |
| FR | 2975350 A1 * | 11/2012 |
| JP | 2011073580 | 4/2011 |
| WO | 2013080017 | 6/2013 |

* cited by examiner

REAR CARRIAGE STRUCTURE FOR AN ELECTRIC VEHICLE

RELATED APPLICATIONS

This application is related to and claims priority from U.S. Provisional Patent Application Ser. No. 61/976,405 filed Apr. 7, 2014, for Modular, electric automobile drive subassembly utilizing a variable speed electric motor as an integral part of a multi-speed transmission mounted transversely with independent suspension for rear-wheel-drive of the vehicle, which is incorporated herein by reference.

TECHNICAL FIELD

The present disclosure relates generally to automobiles. More specifically, the present disclosure relates to systems and methods for providing a rear carriage structure for use with an electric vehicle.

BACKGROUND

The typical attempts at applying electric motors to various types of single and multi-speed gearboxes to propel an automobile utilize sun or planetary gears and perpendicular gear reductions. In many typical embodiments the electric motors are attached in the same position and orientation as an ordinary internal combustion engine with the shaft perpendicular to the drive axles. The rotation of an electric motor may be clockwise or anticlockwise, according to forward and reverse gearing of the transaxle (also referred to as the transmission) of an electric vehicle. The economy of stored energy in the batteries of electric vehicles where the electric motor is perpendicularly connected has inefficiencies due to rotational inertia and parasitic losses associated with perpendicular drivetrain orientation. Accordingly, there is a desire to improve the electric motor economy of this stored energy.

DETAILED DESCRIPTION

Figure 1:
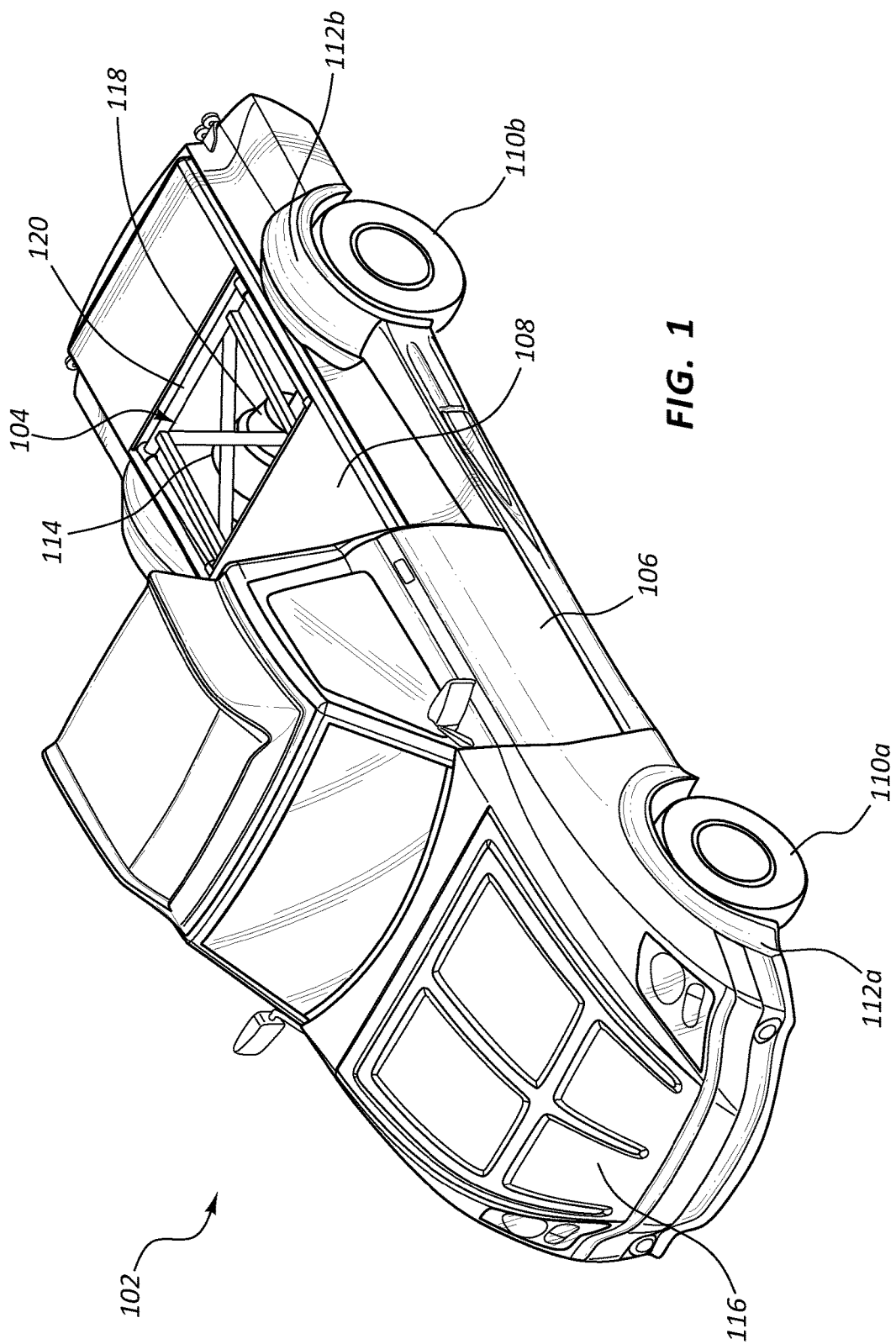
FIG. 1 is a front perspective view of one configuration of an electric vehicle with a cutaway portion showing the rear drive system area of the electric vehicle.

The typical attempts at applying electric motors to various types of single and multi-speed gearboxes to propel an automobile utilize sun or planetary gears and perpendicular gear reductions. The electric motors may be attached in the same position and orientation as an ordinary internal combustion engine with the shaft perpendicular to the drive axles. The rotation of an electric motor may be clockwise or anticlockwise, according to forward and reverse gearing of the transaxle of an electric vehicle. The economy of stored energy in the batteries of electric vehicles where the electric motor is perpendicularly connected may be substantially less than the disclosed technology, due to rotational inertia and parasitic losses associated with perpendicular drivetrain orientation.

Accordingly, there is a desire and economic necessity to improve the electric motor economy of this stored energy. The disclosed technology substantially improves the range of an electric vehicle by reducing the typical rotational inertia and parasitic losses by connecting the motor in a unique and novel mechanical application. The electric vehicle equipped with the disclosed technology can travel at speeds customary with highway operation, which is a significant improvement over the typical electric vehicle limited to low speeds.

Further, the typical assembly process of a motor vehicle is through the installation of assemblies or subassemblies added to the frame or vehicle unibody of a motor vehicle on an assembly line. When a completion of components is added to the motor vehicle, sections of the vehicle can only then be aligned or operated for testing purposes. The disclosed technology is designed to form complete and independent subassemblies that can be tested and aligned prior to installation onto the vehicle frame or vehicle unibody. This is a significant improvement of economy over the current state of the art, enabling the detection and correction of quality shortcomings before adding the value of connection with the vehicle frame or vehicle unibody.

Most electric vehicles require a tremendous amount of power to overcome the vehicle's inertia, or resistance to movement. The vast majority of the battery power is consumed in accelerating the vehicle. For cars, this loss of power efficiency becomes a problem even with just a couple of passengers, but in a truck, which can change weight by a considerable amount (e.g., up to 33 percent) when carrying a load, this inefficient power consumption becomes a problem. Thus, it becomes impractical to have a single speed vehicle. Benefits may be realized by creating an electric rear drive system with multi-speed transmission for trucks.

Some of the mechanical drag in electric vehicles comes from the configuration of the motor, transmission and drive shaft. Most electric vehicles are just like any other truck or car with the motor in the front of the vehicle under the hood, with a transmission behind and a drive shaft that comes back through a differential, which turns the drive force at right angles out to the right or left wheels. This configuration, with each component located perpendicular to one another, creates significant mechanical drag. This mechanical drag is created because every time a right angle turn is made with the gears, efficiency is lost. It is necessary to constantly apply power to the vehicle to maintain speed because of so much drag. By creating a rear-wheel drive system with multiple speeds and all the shafts parallel to one another in the rear of the vehicle, benefits in power efficiency, speed maintenance and vehicle production costs may be realized.

Current embodiments of electric drive systems use a single gear ratio between the motor and the wheels, generally configured as a single electric motor connected through a differential to axles. When the vehicle takes off, it starts at zero (0) rpm on the electric motor and then as the driver applies current to it, the car speeds up. One problem with this configuration is that it requires low speeds on a hill and a tremendous amount of power to get the vehicle moving to overcome inertia if the vehicle is carrying a load.

To overcome this problem, it became necessary to create a rear wheel drive electric vehicle that has multiple speeds with all the shafts parallel one to another, similar to a front wheel drive vehicle, except with the drive system in the back. Such a vehicle required a setup to create suspension connections and motor connections all in one frame. In this configuration, the motor shaft, input shaft of the transmission and axles are all parallel one to another, rolling in the same direction as the vehicle, which eliminates a significant amount of the mechanical drag. Once the vehicle is up to speed, the accelerator can be released and the vehicle's momentum will carry it forward. This represents a significant improvement in energy efficiency because of the decreased amount of energy required to overcome the inertia of the vehicle.

In a traditional perpendicular drive configuration, a vehicle would have two motor mounts in front, one at the rear of the transmission, four bolts that hold the differential and all of the springs in place and 16 bolts that hold the differential to the springs. This configuration becomes quite expensive, complex and heavy. However, with a rear drive system having suspension connections and motor connections all in one single frame and all the shafts parallel, costs and weight are significantly decreased. Additionally, with a rear drive system, the entire system could be mounted or replaced in a matter of minutes since there are so few connection points.

Most, if not all, other electric drive systems on the market do not use independent suspension in the rear of the truck. Rather than employing one long axle, the present systems and methods use CV (constant velocity) joints that allow each wheel to go up and down independently without affecting the other wheel. This improvement keeps both tires flat against the road surface regardless of topology.

FIG. 1 is a front perspective view of one configuration of an electric vehicle 102 with a cutaway portion showing the rear drive system area 104 of the electric vehicle 102. The electric vehicle 102 may be a truck having a cab 106 and a bed 108. Two wheels 110a, 110b are shown in FIG. 1. Above each of the wheels 110a, 110b is a fender 112a, 112b. In between the two front fenders 112a is the hood 116. Disposed within the rear drive system area 104 are the electric motor 114 and the transmission 118 (also referred to as transaxle 118) both attached to a rear carriage structure 120, further details of which will be described below.

Figure 2:
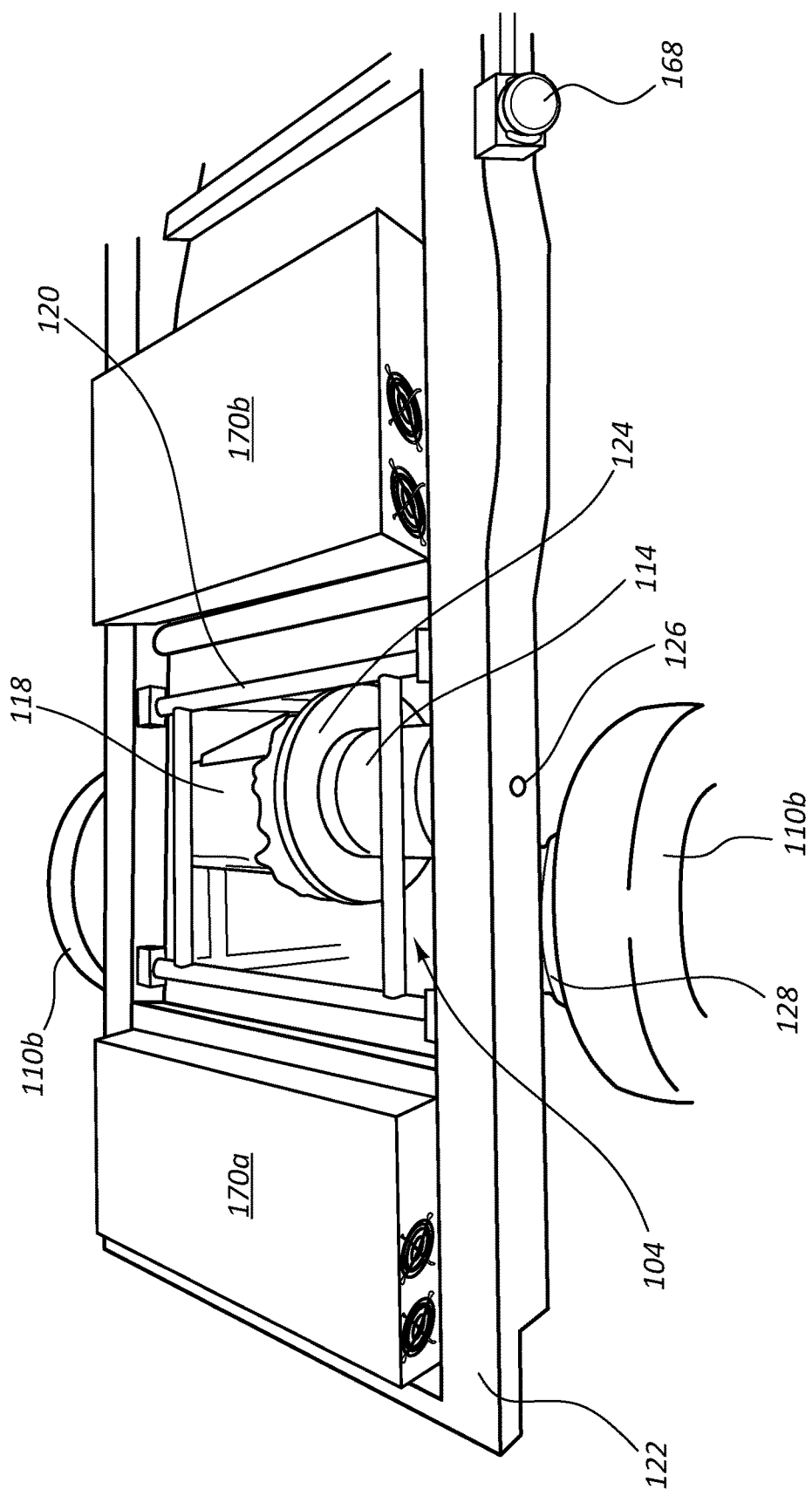
FIG. 2 is a side perspective view of one configuration of an electric vehicle with the bed open such that the rear drive system area is exposed.

One of the advantages of the proposed fully independent suspension incorporated into an integral subframe is that the ground clearance is improved over the typical truck axle with a ring and pinion differential. The typical ring and pinion differential has a housing with a radius that extends below the center of the wheel toward the ground. This reduces the ground clearance to an average of 5" less than the center of the wheel. The differential in the proposed multi-speed transaxle with independent suspension in an integral subframe is even with the center of the wheel, which offers 5" better ground clearance. This allows the wheels to be placed under the surface level of the truck bed, which is a substantial improvement in flat useable space over the typical pickup truck FIG. 2 is a side perspective view of one configuration of an electric vehicle 102 with the bed 108 open such that the rear drive system area 104 is exposed. The rear drive system area 104 has the rear carriage structure 120 that may be attached to the vehicle frame 122 near or substantially in between the rear wheels 110b. An adapter plate 124 couples the transmission 118 to the electric motor 114. The electric motor 114 has an electric motor drive shaft 126. A separate CV joint 128 is coupled to each wheel 110.

The two large aluminum boxes 170a-b are battery cases. These contain the batteries and protect them from damage. There can be up to three battery cases 170 in or near the bed 108 area of the vehicle 102. The small box 168 on the frame is a waterproof receptacle cover with a spring-loaded lid that can be opened manually to allow an ordinary 120-volt power cord to be connected to the onboard battery charger.

Figure 3:
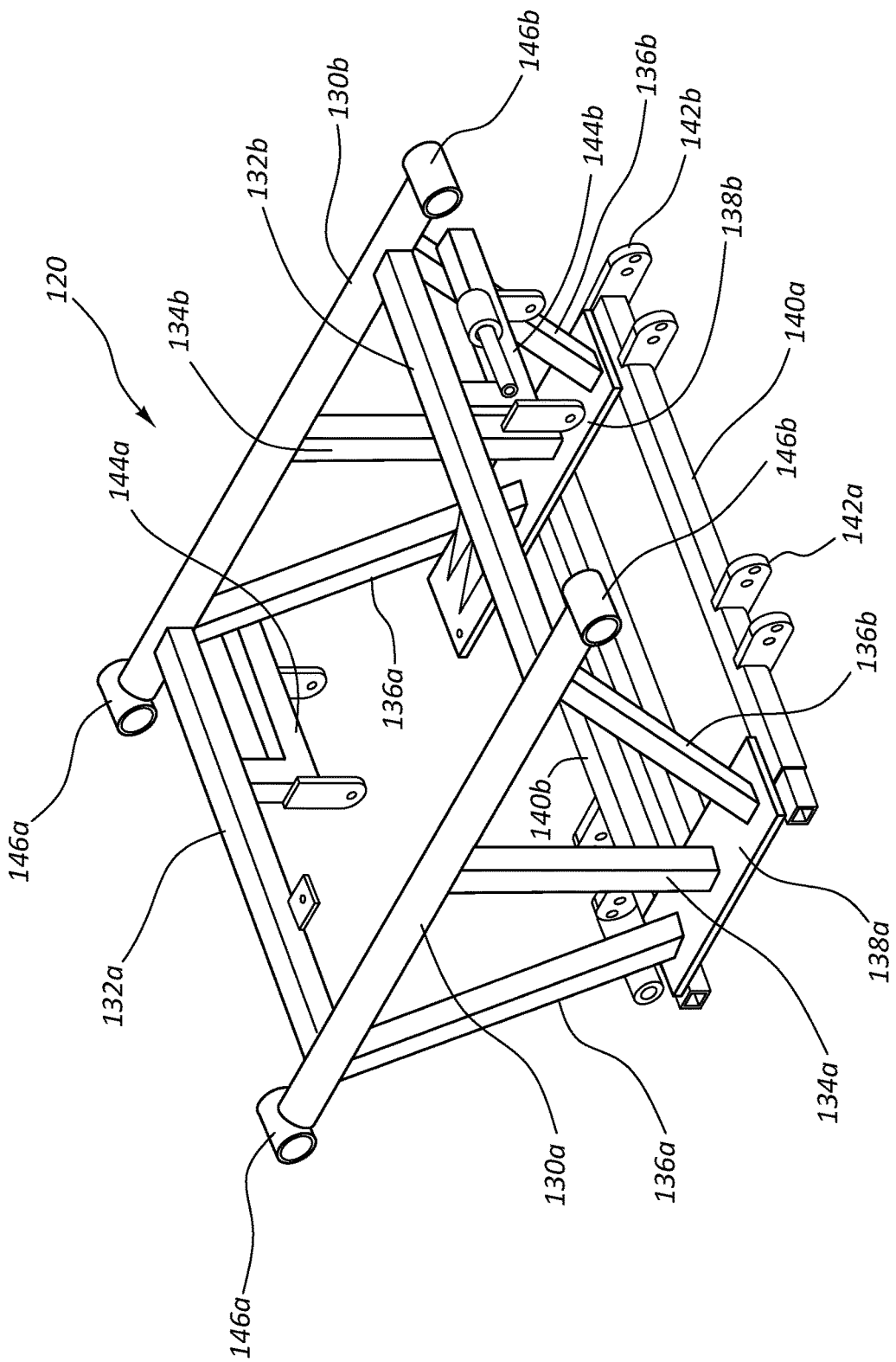
FIG. 3 is a perspective view of the rear carriage structure without the electric motor and without the transmission to illustrate the construction of the rear carriage structure.

FIG. 3 is a perspective view of the rear carriage structure 120 without the electric motor 114 and without the transmission 118 to illustrate the construction of the rear carriage structure 120. The rear carriage structure 120 supports the electric motor 114 (not shown) and the transmission 118 (not shown) in the rear of the vehicle substantially near or in between the rear wheels 110b (not shown). The rear carriage structure 120 includes two parallel beams 130a, 130b. The two parallel beams 130a, 130b are connected by two parallel joists 132a, 132b. Substantially perpendicular to each beam 130 is a vertical support 134a, 134b. Angled supports 136a, 136b may also be connected between the beams 130a, 130b and lower members 138a, 138b.

Two substantially parallel lower control arms 140a, 140b may be connected in between the left and right lower members 138a, 138b. The lower support arms 140a, 140b may have brackets 142a, 142b to connect to the suspension of the vehicle. Two substantially parallel upper control arms 144a, 144b may be connected to each joist 132a, 132b, as shown.

The upper control arm allows for camber adjustments after the toe in has been set. This allows the tire wear to be kept even, greatly extending the life of the tire and improving the adhesion of the tire to the round surface for greater safety. The control arm bracket is integral to the subframe so that the entire unit, including the wheels alignment, and be constructed as a subassembly and then mounted to the vehicle in a modular method with the frame in the normal orientation. This speed of installation is a significant improvement over the typical rear drive axle that must be assembled one piece at a time, usually with the frame 122 in an inverted orientation on the assembly line.

One benefit of the present rear carriage structure 120 is the few number of connections needed to attach the rear carriage structure 120 to the frame 122 of the vehicle. In the configuration as shown, only four bolts are needed to connect the rear carriage structure 120 to the frame 122 of the vehicle. By bolting in four bolts (not shown) into the four bolt connections 146, the rear carriage structure 120 maybe easily attached to, and removed from, the frame 122 of a vehicle 102.

Various dimensions may be used with the current systems and methods. One possible set of dimensions is shown on FIG. 3. For example, in the illustrated configuration, the distance between the two beams 130a, 130b may be approximately 25 and 1/16 inches. The distance between the front and back bolt connections 146a, 146b may be approximately 35 and ⅞ inches. The distance between the lower member 138*a* and the beam 130*a* may be approximately 14 and ⅞ inches.

One embodiment of the invention is that beams, supports, and control arms 140, 144 may be constructed from square or round steel, aluminum, or polymeric compounds of sufficient strength and durability without fibrous structures such as fiberglass or carbon fiber.

Figure 4:
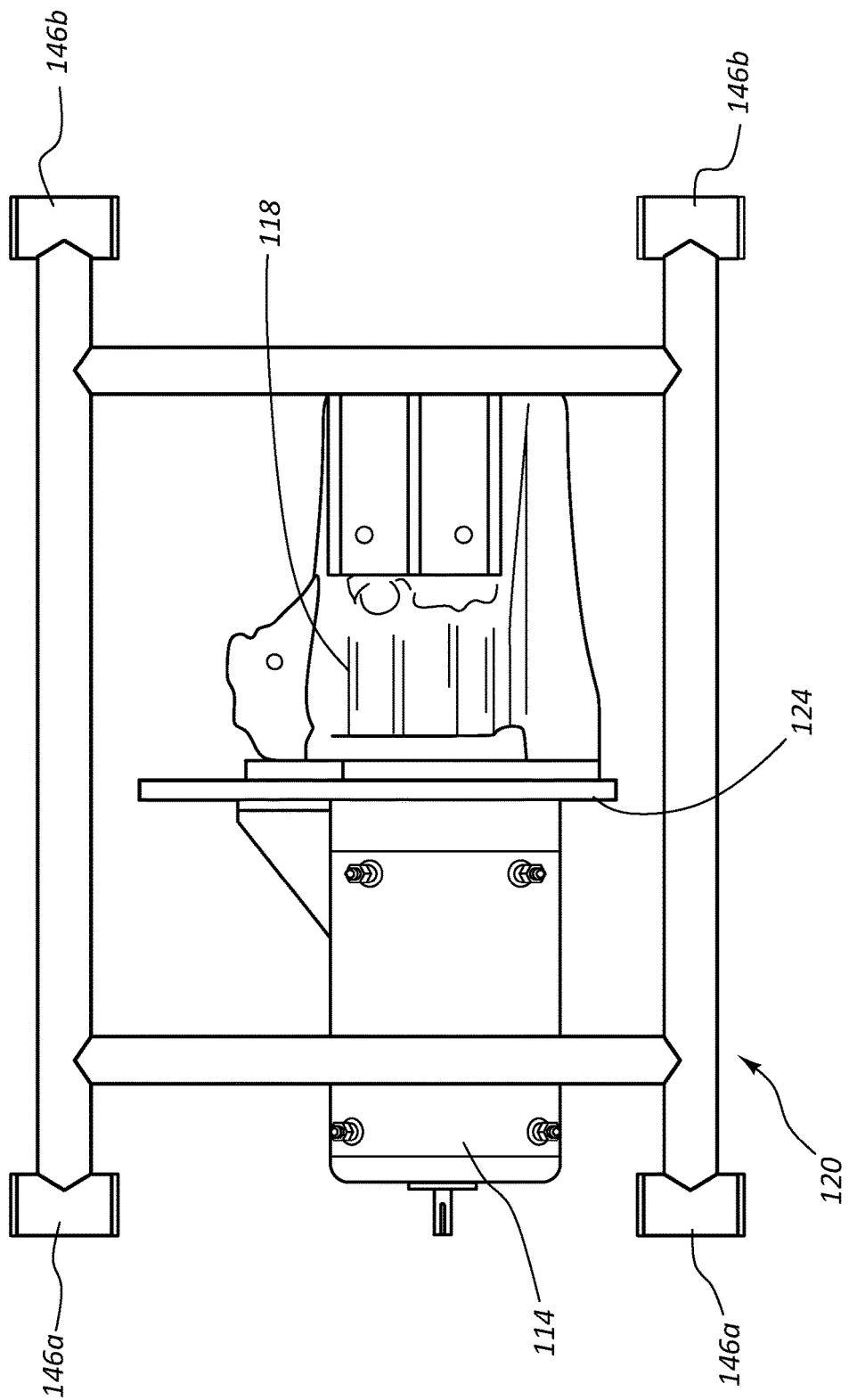
FIG. 4 is a top view of the rear carriage structure of FIG. 3 including the electric motor and the transmission within the rear carriage structure before it is attached to the frame of a vehicle.

FIG. 4 is a top view of the rear carriage structure 120 of FIG. 3 including the electric motor 114 and the transmission 118 within the rear carriage structure 120 before it is attached to the frame 122 of a vehicle. The electric drive motor 114 is substantially aligned with the transmission 118 such that the motor shaft, the input shaft of the transmission 118 and axles are all parallel one to another, rolling in the same direction as the vehicle, which eliminates a significant amount of the mechanical drag.

An aspect of the present systems and methods is to recognize that the most efficient use of the energy investment to get the vehicle to the desired speed is to protect that momentum by reducing the parasitic losses due to mechanical systems, electromagnetic impedance, and wind resistance. That recognition is addressed specifically in the present systems and methods by arranging all the motor armature, the transaxle (or transmission) 118 input 158 and output shafts, and the drive axles 162*a-b* in the same parallel plane, while atypically increasing the bearing sizes on those shafts for a great reduction in parasitic losses compared to the typical automobile drivetrain.

Figure 5:
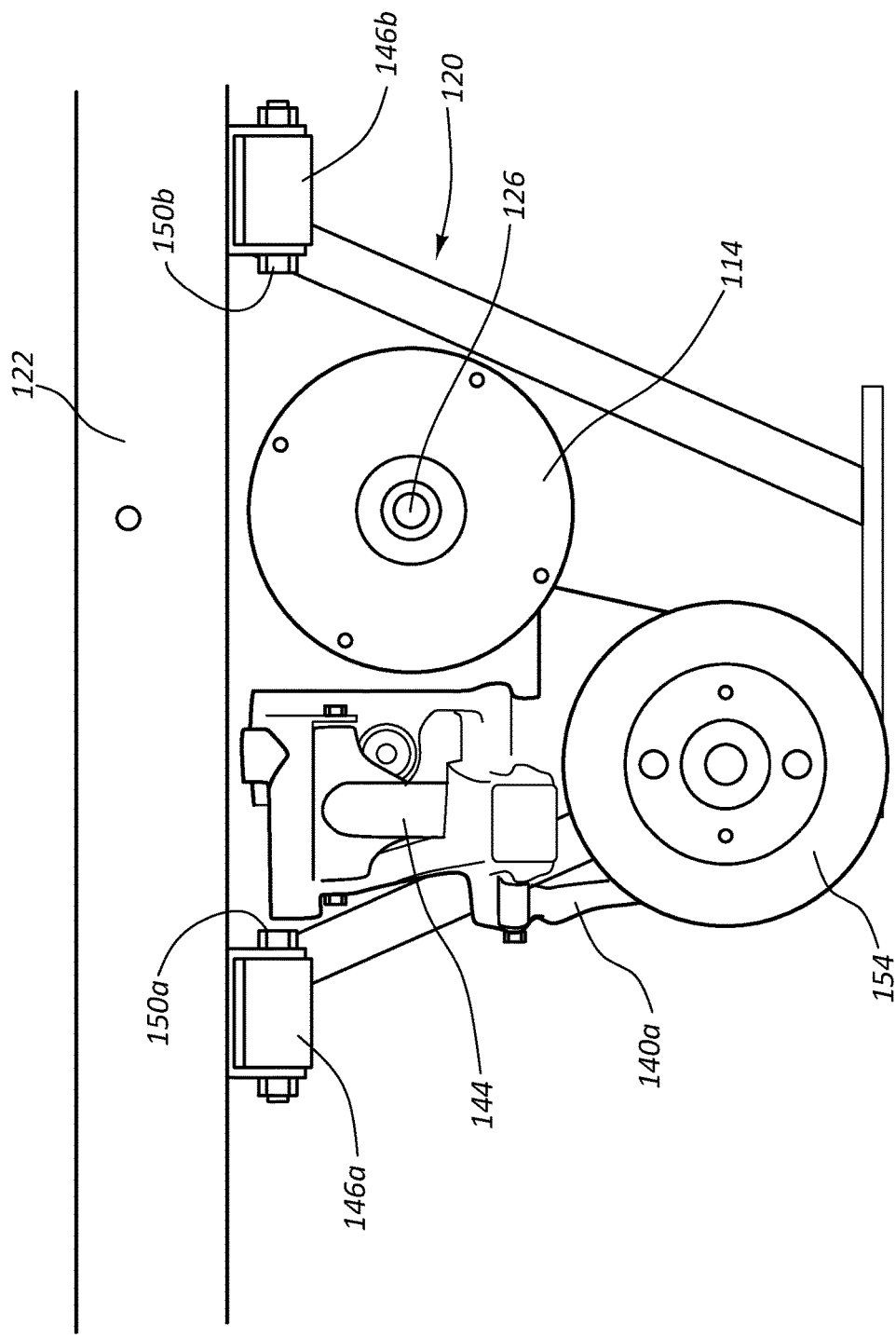
FIG. 5 is a close-up side view of the electric motor connected to the rear carriage structure.

FIG. 5 is a close-up side view of the electric motor 114 connected to the rear carriage structure 120. The electric motor 114 includes an electric motor drive shaft 126. The rear carriage structure 120 is attached to the frame 122 by bolting the rear carriage structure 120 to the frame 122 using bolts 150*a-b* bolted through the bolt connections 146*a-b*. FIG. 5 shows the rear upper control arm 144 is used to adjust the camber of the rear wheels, after the toe-in is aligned using the lower control arm 140*a* adjustment cams. The lower control arm is used to provide the rear wheel alignment and stability for the tire to maintain grip with the road in a superior manner compared to the straight rear axle housing of the typical pickup truck. With the wheel off, the rear disc rotor 154 is shown. The motor adapter, to which the transmission 118 housing and the motor 114 housing are bolted for shaft alignment, is secured to the integral subframe on the bottom with two bolts. The transmission 118 is further secured with four bolts through a top bracket 142*b* affixed to the integral subframe. The motor 114 is further secured with a single bolt connecting its steel housing to a bracket 142 affixed to the integral subframe. These seven bolts secure the motor and transmission as an integral subassembly to the integral subframe, forming a modular subassembly.

An aspect of the present systems and methods is to recognize that a significant portion of the costs of assembly and maintenance are found in the labor and tooling it takes to install and remove the drivetrain of the automobile. The typical installation of a drivetrain involves inverting the frame 122 for the rear axle and spring installation, and then turning the vehicle back over to install the motor 114 and transmission 118. The two are then connected on the chassis with a drive axle in line with the motor, but at a right angle to the drive axle 162 while elevating the vehicle so that a technician can stand under the vehicle and work overhead. Installing the drivetrain involves more than 28 bolts and numerous special tools. Removing the drivetrain can take as much as 8 hours, once the vehicle is assembled. The proposed systems and methods allows the entire drivetrain to be installed into the vehicle with less than 5 bolts in one operation taking less than 5 minutes. The entire drivetrain can be exchanged in less than 30 minutes without the use of special tools or an overhead lift. This feature greatly reduces the cost of assembly and maintenance.

Figure 6:
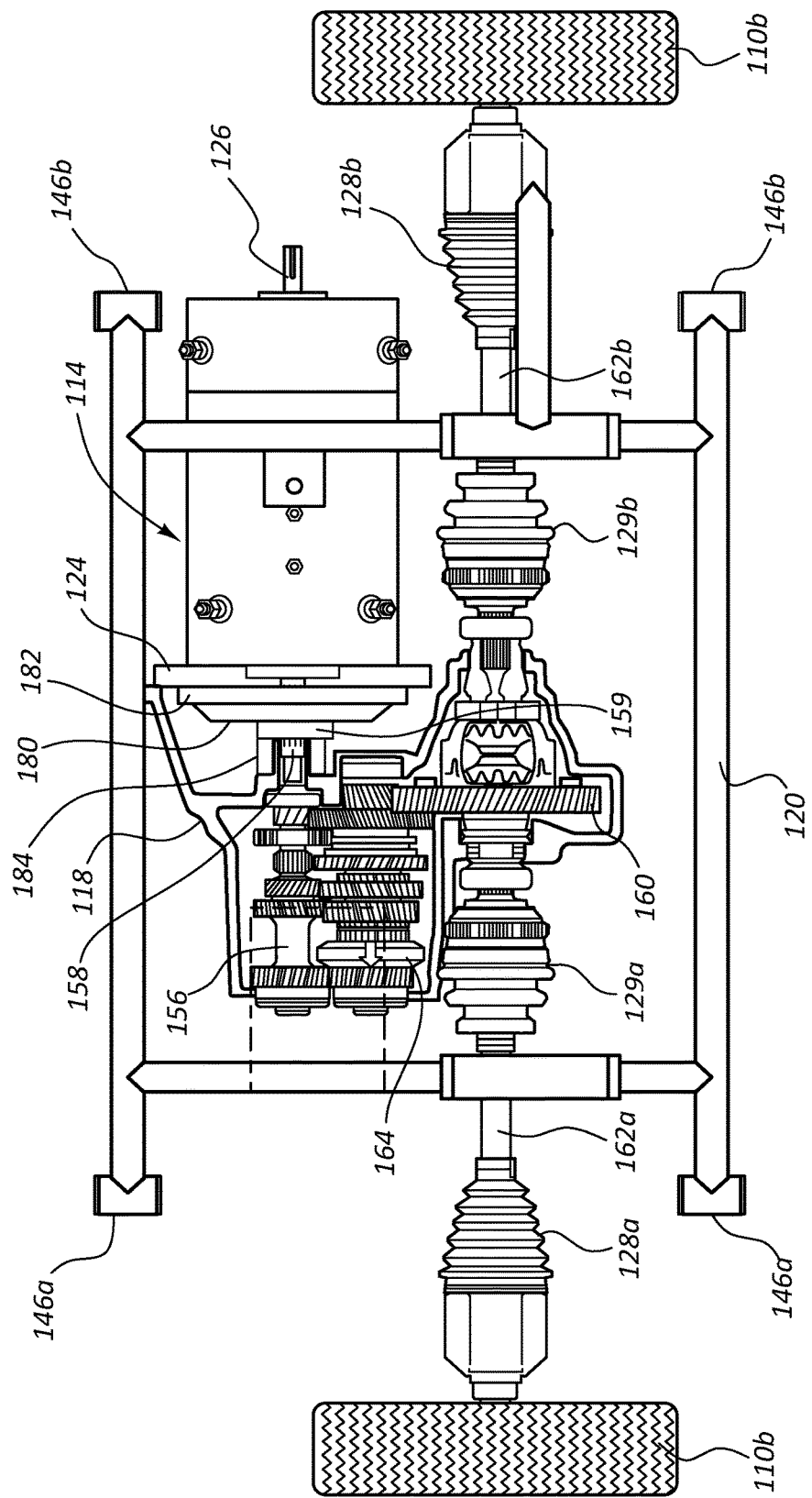
FIG. 6 is a rear view of the electric motor engaged by the transmission with the rear carriage structure shown in broken lines.

FIG. 6 is a rear view of the rear drive system, which includes the electric motor 114 engaged by the transmission 118 with the rear drive carriage 120. The outer Constant Velocity (CV) joint 128 and the inner Constant Velocity (CV) joint 129 are also shown. The electric motor 114 is fastened to the adapter plate 124 that aligns the electric motor 114 to the input cluster gear shaft 156 that connects with selectable ratios to the output shaft of a multi-speed transaxle/transmission 118, forming a complete and modular electric transaxle 118 subassembly. The transaxle 118 subassembly's internal input shaft 158 is selectively meshed with the driven shaft 164 providing more than one gear ratio between the input cluster gear shaft 156 and the drive shaft 126. The selection of higher ratios between the shafts multiplies the amount of torque the electric motor 114 can deliver to the differential ring gear 160, which is connected to the driver side drive axle 162*a* and passenger side drive axle 162*b*. The wheels 110*a-b* attached to the ends of the axles 162 are rotated by the torque produced by the motor 114 that is rotating in the same direction as the wheels 110*a-b* with greater efficiency and electric vehicle range per unit of stored energy compared to the current state of the art with its rotational inertia and parasitic losses.

The connection between the electric motor 114 and the input shaft 158 of the multi-speed transaxle 118 varies between a manual and an automatic version of the transaxle 118. The manual transmission 118 is configured to disconnect the motor 114 from the input shaft 158 of the transmission 118 in order to allow the ratios to be changed as the transmission's 118 synchronizer works to match the speeds of the two shafts for gear alignment without damage. This is a manual transmission shown in the figure; however, an embodiment of the present systems and methods may utilize an automatically Shifting Manual Transmission would be exactly the same, but with the replacement of shifting cables leading to a shift lever in the cab with electronically controlled actuators mounted on the transmission.

This is accomplished with a diaphragm spring pressure plate 180 attached to a flywheel 182 and being released with a hydraulic release bearing 184 releasing the spring and making a gap between the flywheel 182 and the pressure plate 180 in which the flywheel 182, which is connected to the motor shaft 126, and the flywheel, inside of which can freely spin the clutch disc. The precision machined bronze bushing 159 aligns the centers of the shafts utilizing a bronze bearing surface sliding against the tapered surface of the transaxle input shaft 158 in a particular design of floating pilot bearing. The design is fitted into a machined metal, tapered lock coupler that is machined.

An embodiment of the present systems and methods is the engineered, lightweight, exoskeletal frame 122, to which the subassembly is fastened, utilizing less than five particular attachment points to install the entire rear carriage structure 120, including the motor 114, the multi-speed transaxle 118 and the adapter 124, the transaxle's internal meshed gear shafts and differential gear 160, the drive axles 162*a*, and the wheels 110*a-b* and tires, into the electric vehicle 102 for easy installation or removal from the electric vehicle 102 for easy repair. An aspect of the present systems and methods is that because less energy is required to accelerate with a multi-speed transaxle, less heat is generated than the typical technology. With reduced heat generation, air cooling is sufficient to protect the motor and controller from overheating. The air-cooled weight reduction from typical water-cooled electric drive technologies is a significant advantage in power-to-weight calculations.

The particular arrangement of the electric motor 114 and the transaxle 118 as one subassembly may be fastened securely inside a six-sided exoskeleton. The six-sided exoskeleton may be made of a lightweight, metal or composite framework, preferably steel, and even more preferably Aluminum, welded together at all joints. The structure is particularly strengthened with the tubing members comprising a round, aluminum tubing of 1¾" diameter, the connection of which is preferably precision coped to support strong welds and to form welded in triangles connected to form a five-sided truss into which the motor and transaxle 118 subassembly may be connected using non-permanent fasteners. The sixth side of the truss is connected to the five-sided truss using non-permanent fasteners after the motor 114 and transaxle 118 subassembly is integrated into the truss exoskeleton, capturing the motor 114 and transaxle 118 assembly in a substantially stronger and lighter electric drive assembly that the current state of the art. The exoskeleton may be made of steel tubing, but the lesser weight of aluminum is more preferable.

The rear carriage structure 120 may be made out of various materials. For example, the rear carriage structure 120 may be made out of aluminum or steel. Examples of kinds of steel that may be used are chrome moly steel and 4130 steel.

The axle and CV (constant velocity) joints 128a-b protrude through the exoskeleton to connect the wheel 110 and tire with the transaxle 118. The lower control arms 140 are also constructed of lightweight, tubular aluminum and are connected to eccentric pivot axles on the six-sided truss to facilitate the adjustment of the real wheel caster angle of the spindle on which turns the wheel 110 and tire assembly. Further, the upper control arms 144a-b are also constructed of lightweight, tubular aluminum and are connected to eccentric axles on the top of the spindles to facilitate the adjustment of the camber angle of the rear wheels 110b.

A fully adjustable shock absorber may facilitate an adjustable ride height of the rear of the vehicle. Further, extra upper shock mounting holes may provide an extra hole of adjustment for adjusting the ride height of the vehicle. Increasing the distance of the upper and lower shock absorber connections between the frame 122 and lower control arm 140 will raise the vehicle, increasing the vehicle's ability to carry heavy loads from one to another.

The output shaft is connected by various selectable ratios to the input shaft 158, which is aligned with the motor 114 by the adapter plate 124.

Figure 7:
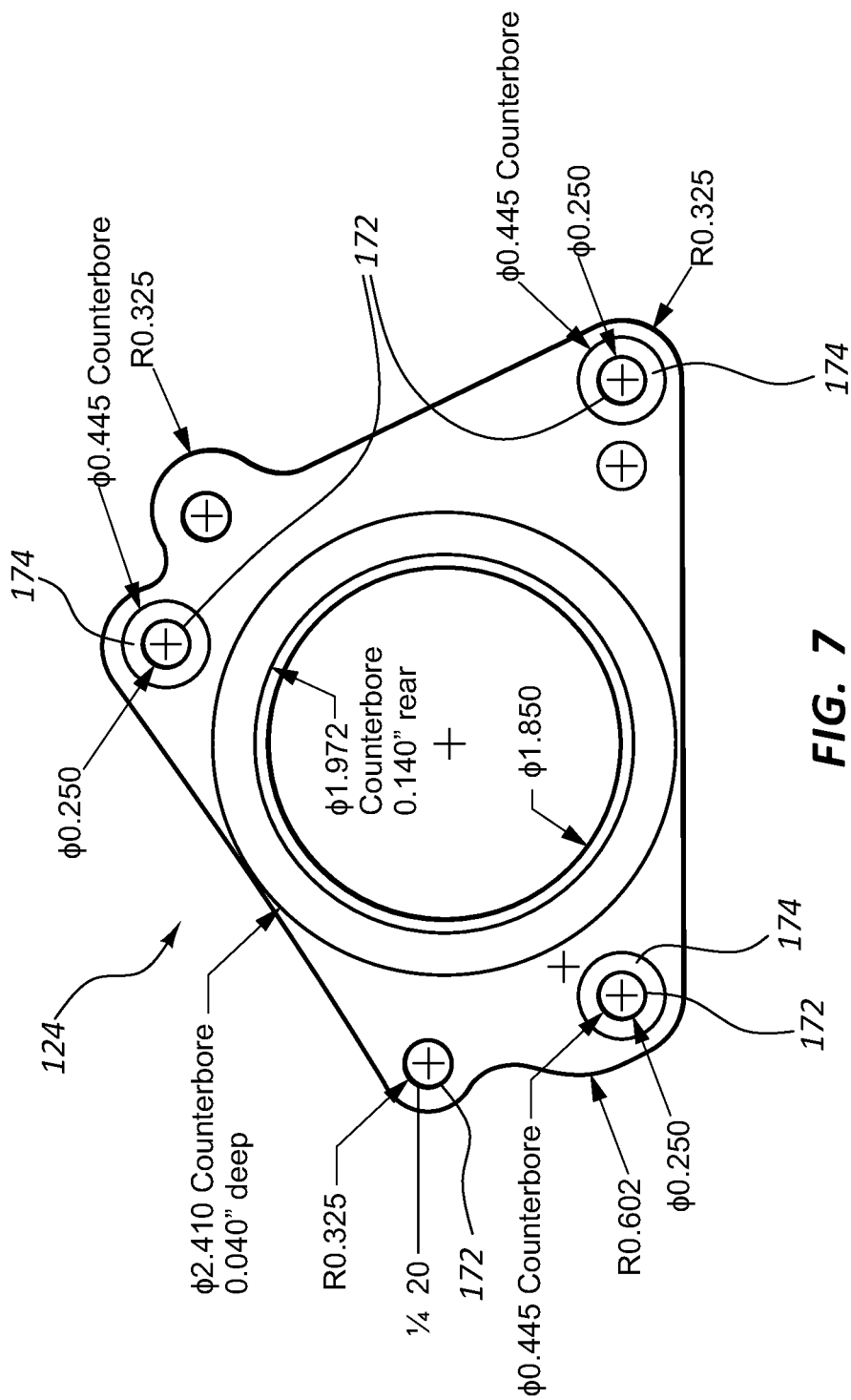
FIG. 7 is a side view of one configuration of an adapter plate.

FIG. 7 is a side view of one configuration of an adapter plate 124. One possible set of dimensions are shown in FIG. 7, all of which are measured in inches. Bolt holes 172 and counterbores 174 are machined or cast into the adapter plate 124 to securely and temporarily attach the hydraulic release bearing 184 to the transaxle 118 housing for the purpose of precisely aligning the release bearing 184 with the multi-speed transaxle input shaft 158.

This alignment is important to the elimination of vibration and premature wear of the bearings in either the release bearing 184 or the pressure plate 180.

Figure 8:
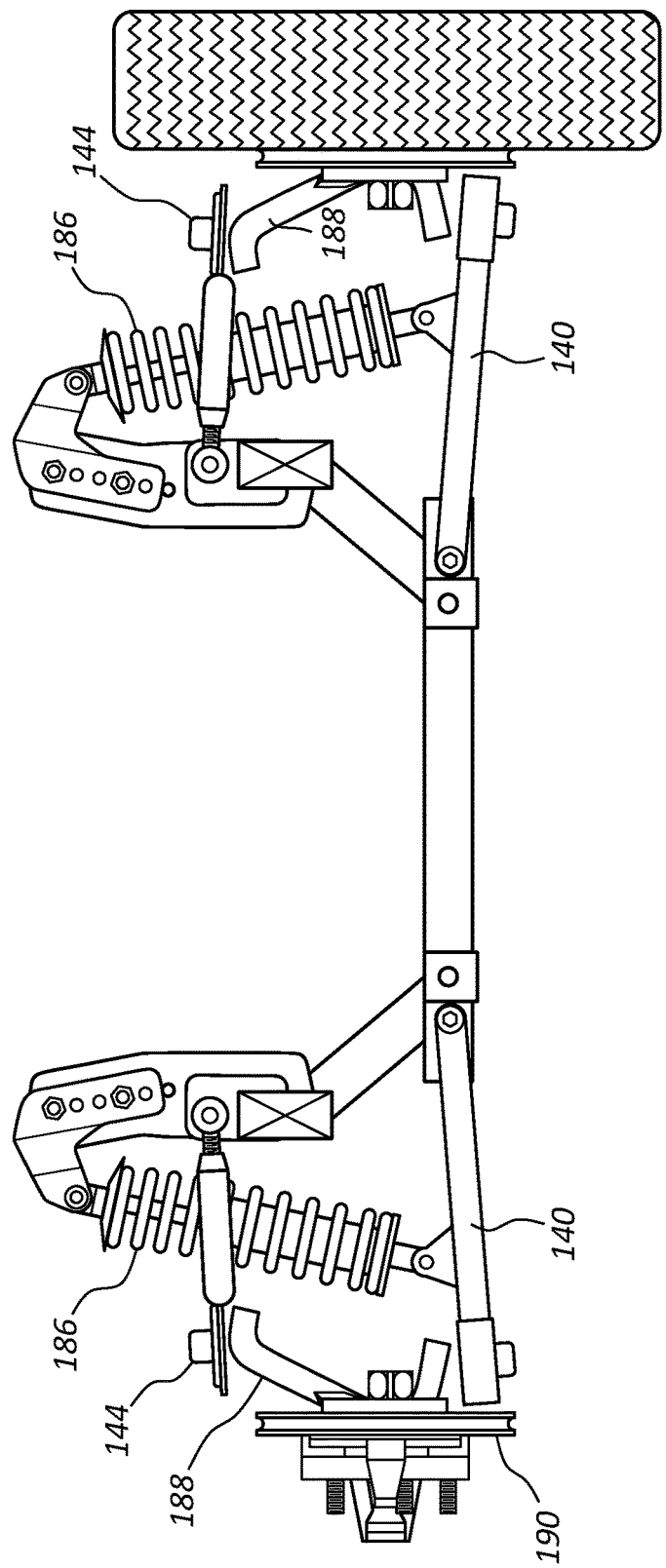
FIG. 8 is a view of the front end subassembly.
Figure 9:
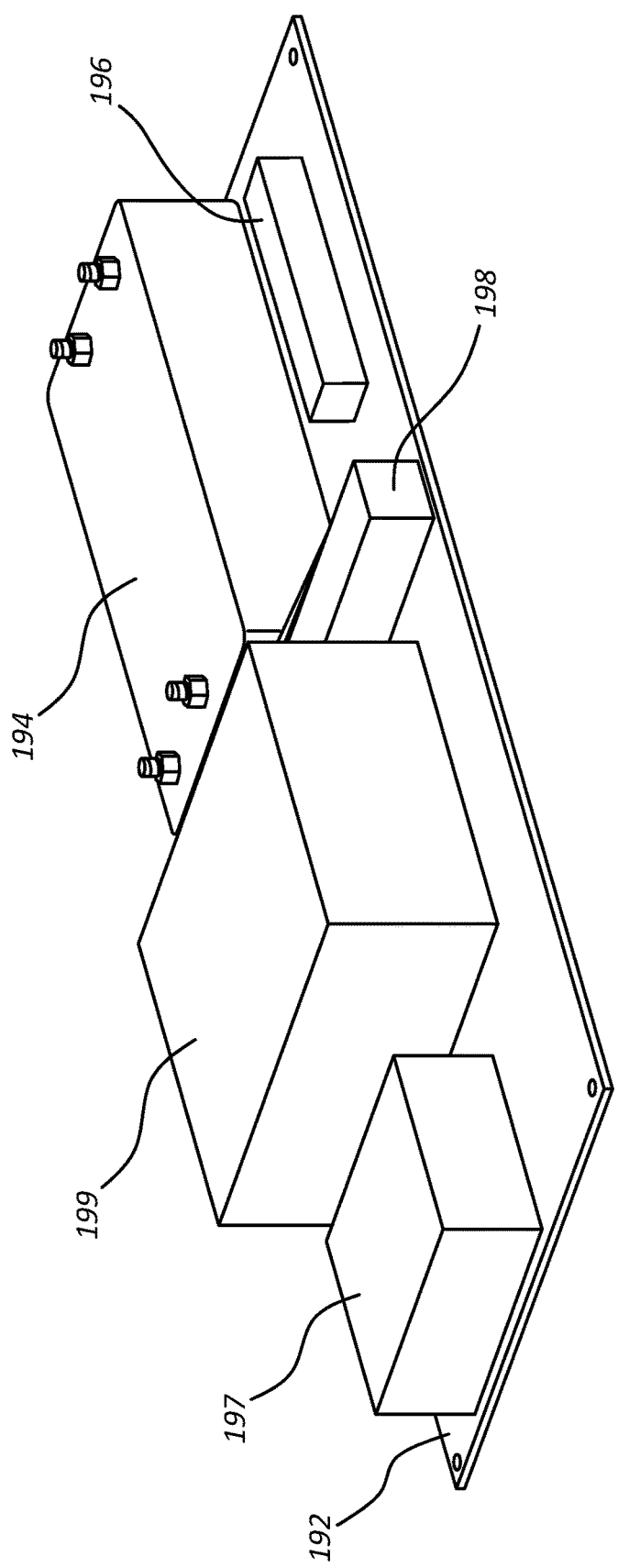
FIG. 9 is a perspective view of the high voltage panel.
Figure 10:
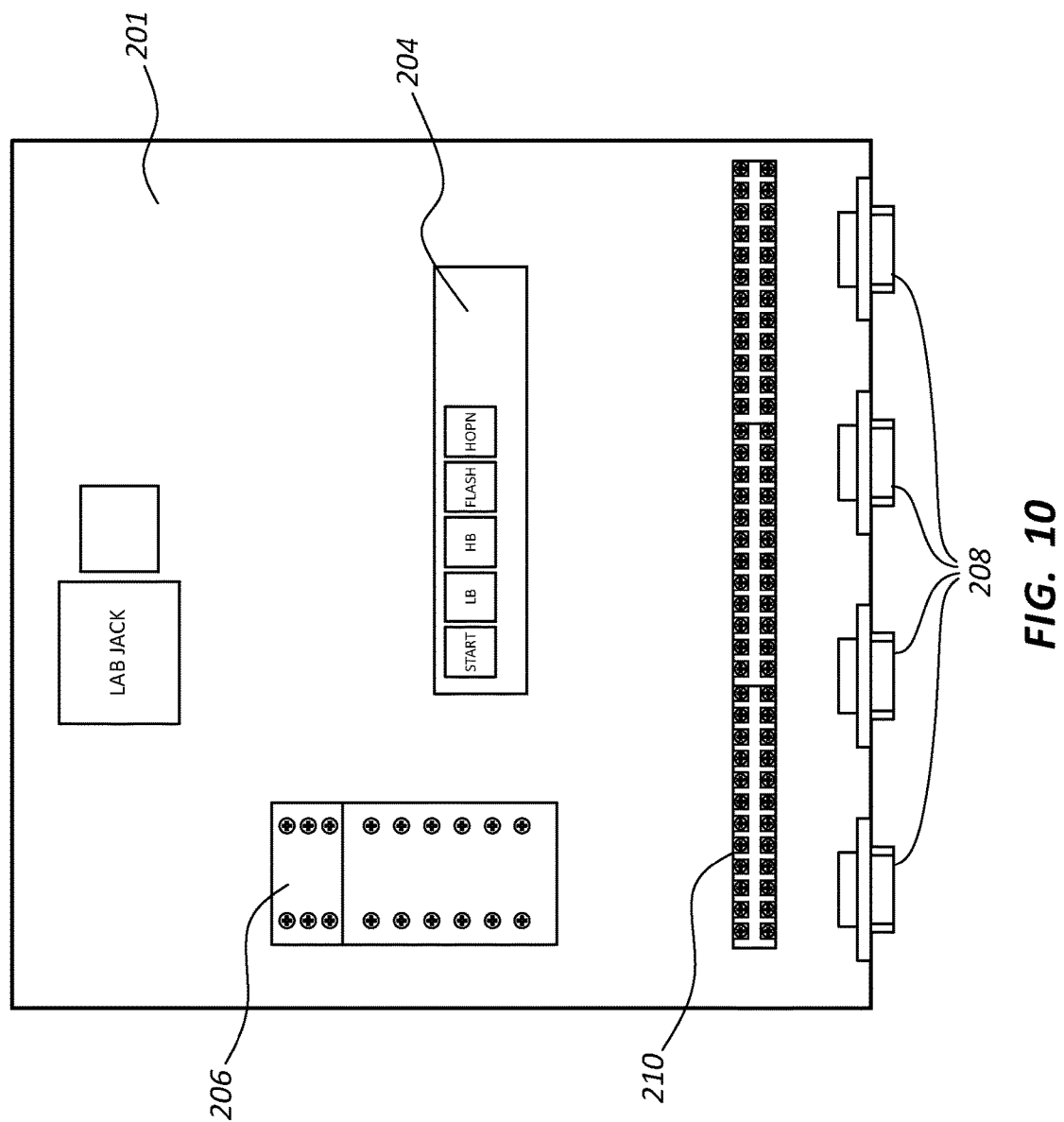
FIG. 10 is a view of the low voltage panel.

A kit may be provided from which the electric vehicle 102 may be assembled. The batteries may be sold or provided separately. The kit may include the following items:

a. The frame 122, partially assembled to reveal the relation of the rear drive to the rear carriage.

b. The rear drive subassembly 120, which is the subframe that contains the transmission, motor, upper and lower control arms, and shocks, to which the rear knuckles are bolted. The complete assembly may be referred to as the rear drive system, which is everything in between the outside rear tires. This can be bolted into the frame with 4 bolts.

c. The front end subassembly, which is made of the control arms 140, 144, steering rack, spindles and brakes, as illustrated in FIG. 8, which depicts the shock absorber 186 fastened to the lower control arm 140. Supported by the lower control arm 140 is the front spindle 188 that is fastened to the upper control arm 144 forming a suspension. The brake rotor and hub assembly 190. The wheel and tire assembly is bolted to the brake rotor and hub assembly 190. The suspension supports the frame 122 to adapt to variations in the road conditions for optimum traction.

d. High Voltage Panel, illustrated in FIG. 9, which includes the controller, charger, DC-DC converter, BMS relays and the fuses. The High Voltage Panel model depicts the hinged panel 192 upon which is mounted the Controller 194, the Main Fuse 196, the Main Contactor 198, the Battery Pack Charger 199, and the DC to DC Converter 197.

e. The Low Voltage panel, which is everything that switches, illuminates, and fuses the 12-volt system, is illustrated in FIG. 10. The Low Voltage Panel consists of a drawer 202 with bearing slides and a key lock that is inserted under the passenger seat. On the bottom panel of the drawer 202 is positioned a Relay Bank 204 that contains relays electrically activated by low-current switches. Each Relay contact is connected to a fuse located in the Fuse Bank 206 and to the peripheral on the vehicle such as the low beams, high beams, horn, turn signals, and push-to-start button. The drawer 202 is connected to a harness on the vehicle via four bulkhead connectors 208 and through internal connection strips 210. Certain signals are treated for output to the instruments using a circuit board 4 designed to condition the input signal to one compatible with the instrument.

f. The battery packs or battery cases 170a-b (as shown in FIG. 2), which includes the steel, the fuses, and the cables and connectors. The battery cases 170a-b each individually are wired so that the batteries are in series to develop sufficient voltage to power the drivetrain. The typical battery case utilizes solid copper, sometimes nickel plated, bars bolted across the terminals. The rigidity of the solid is problematic, as the vibrations inherent with a moving automobile on the driving surface transfer to this rigid connection. The surfaces often are pitted and eroded over time due to arcing and sputtering that occurs while the batteries are under load. In addition, the exposed metal is a hazard due to dangerous short circuits that can occur during an accident or through mishandling of metal tools when the battery case lid is removed. The proposed systems and methods solve these problems by utilizing a rubber overcoated, flexible connector that is bolted to the battery terminals, forming a very vibration resistant battery case. The overcoated connectors prevent short circuits by insulating all the previously exposed metal surfaces. Further, the overcoated, flexible copper braid of the connector is not affected by the minor vehicle vibrations from the road surface. This is a significant improvement over the typical battery connection technology.

g. The cab 106 complete outside.

h. Various parts, such as interior parts, fenders 112, hood 116, trunk, and bumper.

Figure 11:
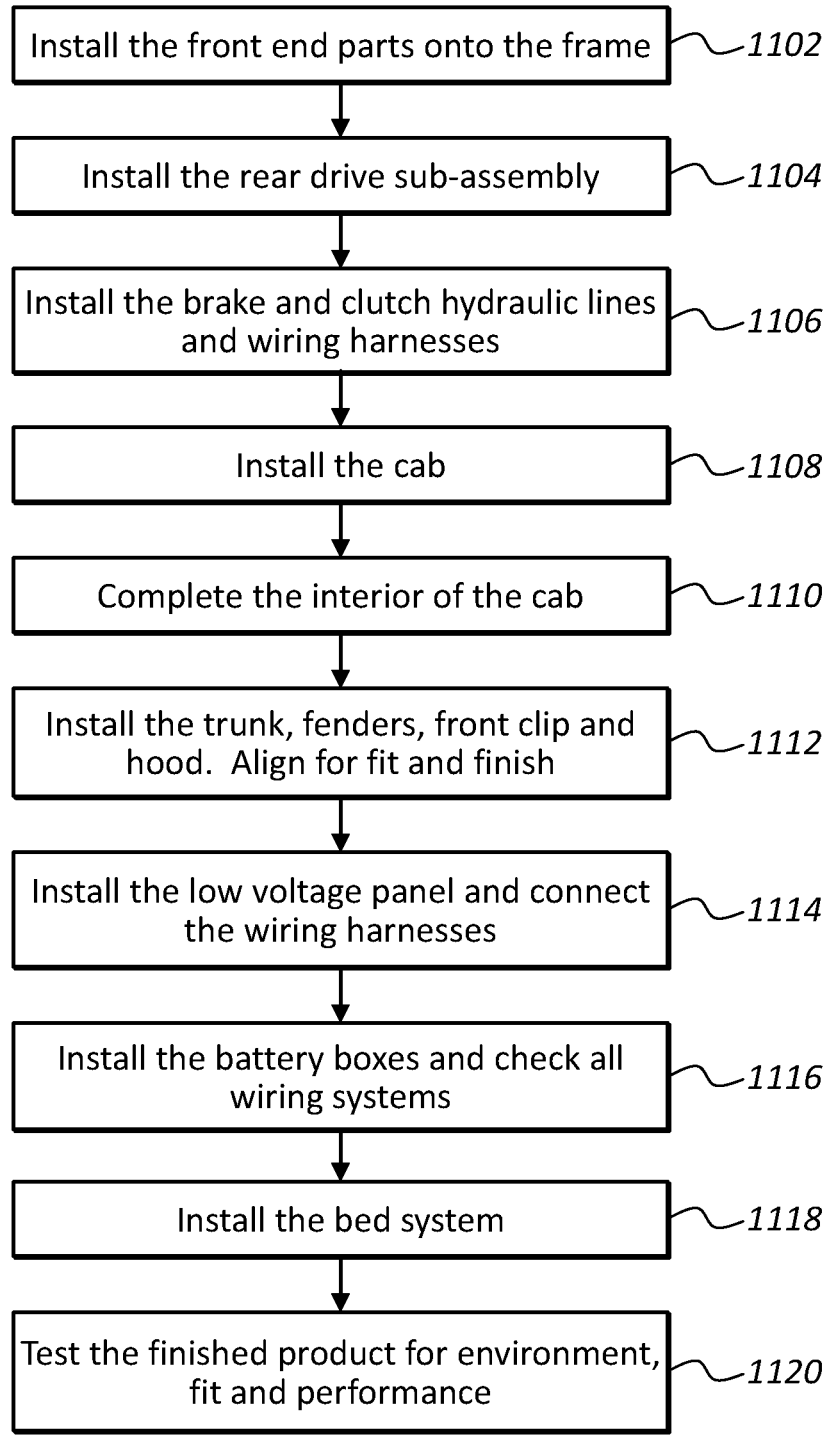
FIG. 11 is a flow diagram illustrating one configuration of a method for assembling the electric vehicle from a kit.

FIG. 11 is a flow diagram illustrating one configuration of a method for assembling the electric vehicle 102 from a kit. The front end parts may be installed 1102 onto the frame 122. The rear drive subassembly (rear carriage structure 120) is installed 1104 onto the frame 122. The brake and clutch hydraulic lines and wiring harnesses are installed 1106. The cab 106 is installed 1108 onto the frame 122. Then the interior of the cab 106 is completed 1110. The trunk, fenders 112, front clip and hood 116 are all then installed, aligned for fit and finished 1112. The low voltage panel is installed and the wiring harnesses are connected 1114. The battery boxes are installed and all wiring systems are checked 1116. The bed 108 system is installed 1118. Final testing is the performed 1120 on the vehicle such as for environment, fit and performance.

In this application, the methods comprise steps or actions for achieving the functions and processes described above. The method steps are to be understood as interchangeable with one another. The interchanging of a step is not to be understood as departing from the scope of the claims. In this application, the order of steps and actions may be modified and not depart from the scope of the claims, unless a specific order is stated for the steps or actions being described.

The claims are to be understood to not be limited to the exact configuration and components discussed above. The claims are to be understood to cover any reasonable modifications, changes and variations of the arrangement, operation and details of the systems, methods, and apparatus described herein.

What is claimed is:

1. An electric vehicle traction drive assembly comprising:
a variable-speed electric motor for providing torque;
a multi-speed transaxle for multiplying the torque of the variable-speed electric motor through selection between more than one gear ratio; and
an adapter mechanically coupled between the variable-speed electric motor and the multi-speed transaxle to integrate the variable-speed electric motor with the multi-speed transaxle utilizing a bearing surface sliding against a tapered surface of an input shaft of the multi-speed transaxle in a floating pilot bearing, keeping an output shaft of the variable-speed electric motor center-aligned with the input shaft of the multi-speed transaxle.

2. The electric vehicle traction drive assembly of claim 1, further comprising:
right and left constant velocity axles connected to an output differential of the multi-speed transaxle in parallel to the output shaft of the variable-speed electric motor, wherein shafts of the multi-speed transaxle form a subassembly.

3. The electric vehicle traction drive assembly of claim 1, wherein the output shaft of the variable-speed electric motor, the input shaft of the multi-speed transaxle, and right and left constant velocity axles are parallel one to another and in a rear of a vehicle when installed.

4. The electric vehicle traction drive assembly of claim 3, wherein the output shaft of the variable-speed electric motor, the input shaft of the multi-speed transaxle, and the right and left constant velocity axles are located substantially in between rear wheels when installed.

5. The electric vehicle traction drive assembly of claim 4, wherein the output shaft of the variable-speed electric motor, the input shaft of the multi-speed transaxle and the right and left constant velocity axles turn in the same direction.

6. The electric vehicle traction drive assembly of claim 1, wherein the electric vehicle traction drive assembly comprises a single solid and permanent frame utilizing less than five attachment points to install a rear carriage structure, the rear carriage structure comprising the variable-speed electric motor, the multi-speed transaxle, the adapter, upper and lower control arms, shocks, wheels, tires, and drive axles.

7. An electric truck comprising:
a frame;
a cab attached to the frame; and
a vehicle traction drive assembly attached to the frame including:
a variable-speed electric motor for providing torque;
a multi-speed transaxle for multiplying the torque of the variable-speed electric motor through selection between more than one gear ratio; and
an adapter mechanically coupled between the variable-speed electric motor and the multi-speed transaxle to integrate the variable-speed electric motor with the multi-speed transaxle utilizing a bearing surface sliding against a tapered surface of an input shaft of the multi-speed transaxle in a floating pilot bearing, keeping an output shaft of the variable-speed electric motor center-aligned with the input shaft of the multi-speed transaxle.

8. The electric truck of claim 7, wherein the electric truck uses independent suspension in the rear of the electric truck.

9. The electric truck of claim 7, further comprising a rear wheel drive system having constant velocity joints that allow each rear wheel to go up and down independently without affecting the other wheel.

10. The electric truck of claim 7, wherein there is no aqueous cooling system.

11. The electric truck of claim 7, wherein the vehicle traction drive assembly is mounted and deployed as a non-steerable rear traction drive of the truck.

12. The electric truck of claim 7, further comprising a suspension, where the suspension is independent and where each wheel and tire assembly may be independently adjusted for camber and caster angles using eccentric cams and bolts.

13. A method for assembling an electric truck, comprising:
obtaining a kit for assembling an electric truck, wherein the kit comprises:
a frame;
a cab;
a vehicle traction drive assembly;
a variable-speed electric motor;
a multi-speed transaxle for multiplying torque of the variable-speed electric motor through selection between more than one gear ratio;
an adapter configured to mechanically couple the variable-speed electric motor and the multi-speed transaxle to integrate the variable-speed electric motor with the multi-speed transaxle utilizing a bearing surface sliding against a tapered surface of an input shaft of the multi-speed transaxle in a floating pilot bearing, keeping an output shaft of the variable-speed electric motor center-aligned with the input shaft of the multi-speed transaxle; and
assembling parts from the kit to provide the electric truck.

* * * * *